United States Patent [19]

Banks

[11] 3,995,810
[45] Dec. 7, 1976

[54] TEMPERATURE COMPENSATION CONTROL

[76] Inventor: James R. Banks, R.F.D. 2 Box 113, Dover, N.H. 03820

[22] Filed: Oct. 3, 1975

[21] Appl. No.: 619,234

[52] U.S. Cl. .......................... 237/8 R; 236/91 F; 73/362 SC
[51] Int. Cl.² ........................................ F24D 3/00
[58] Field of Search ............ 236/91 F, 91 D, 91 G; 237/8 R; 62/209; 73/362 SC

[56] References Cited
UNITED STATES PATENTS

| | | | |
|---|---|---|---|
| 2,804,269 | 8/1957 | Galavics | 236/91 F |
| 3,604,957 | 9/1971 | Satula | 73/362 SC |

Primary Examiner—William E. Wayner
Attorney, Agent, or Firm—Thomas N. Tarrant

[57] ABSTRACT

A temperature compensation system using forward biased pn semiconductor junctions as temperature sensing elements to compensate for the rate of heat loss or gain by controlling the temperature of a fluid heat exchange medium. A differential amplifier is driven by changes in the junction voltage drops and controls power to the heating element so as to maintain a controlled relation between the temperature being overcome and the temperature of the heat exchange medium.

11 Claims, 4 Drawing Figures

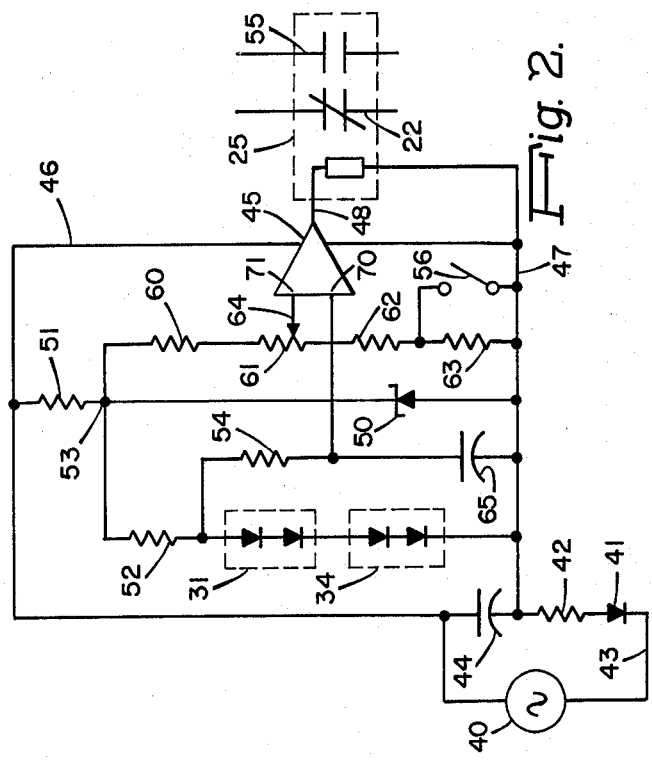
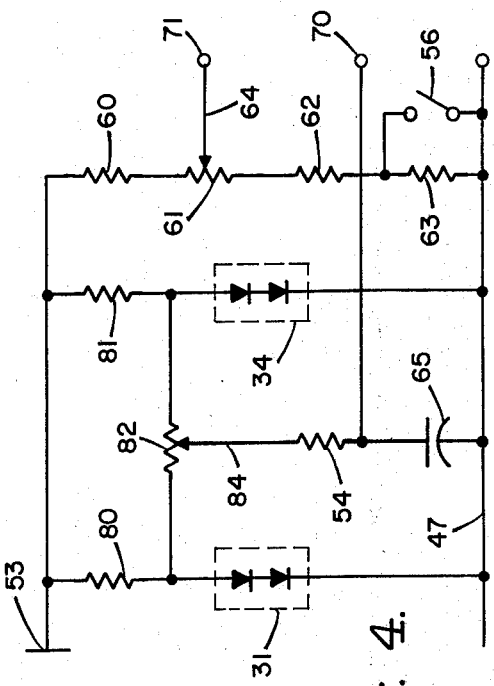
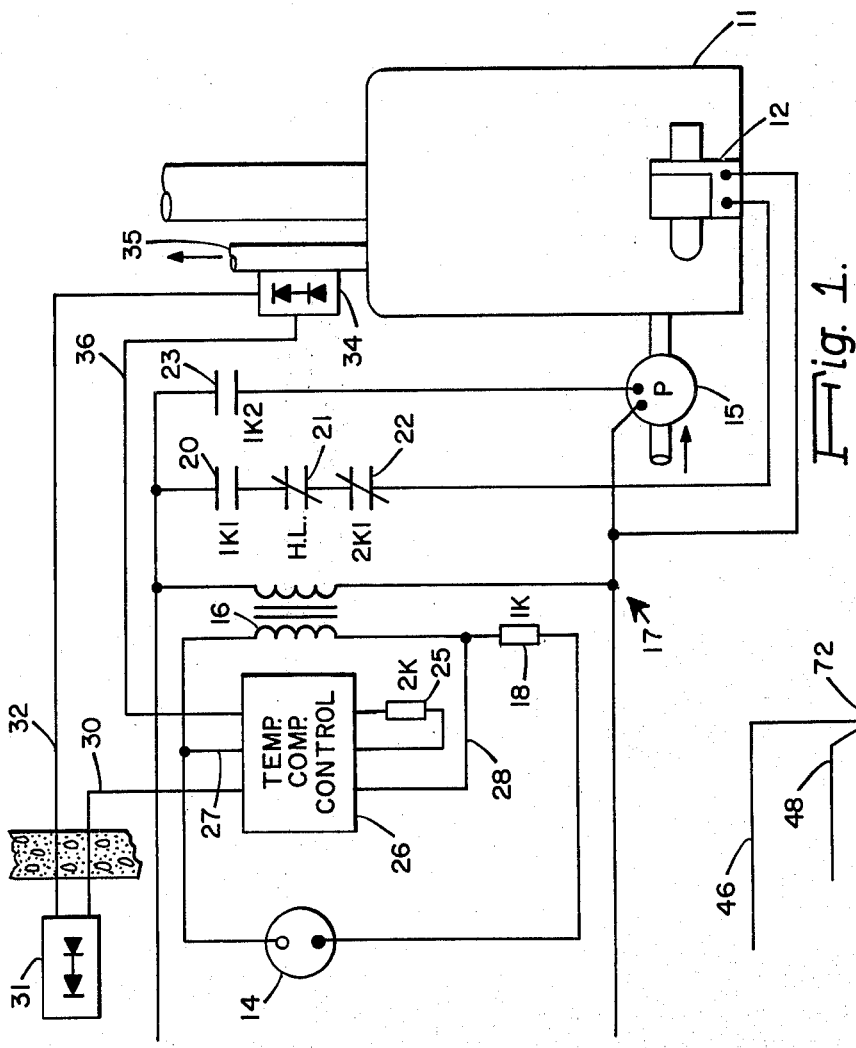
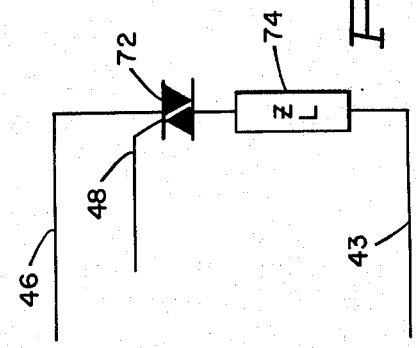

TEMPERATURE COMPENSATION CONTROL

BACKGROUND OF THE INVENTION

1. Field of the Invention

The present invention relates to thermostatically controlled temperature conditioning systems which circulate a fluid heat exchange medium to the areas to be conditioned and in particular to such systems that control the outlet temperature of the fluid medium inversely with outdoor temperature or other temperature reservoir producing an undesired loss or gain.

2. Description of the Prior Art

Temperature conditioning systems generally are used to provide a stable desirable temperature by overcoming heat transfer to or from a heat reservoir that is at a different temperature from the desired temperature. In a home temperature conditioning system the heat reservoir is the outdoor atmosphere and produces an undesired transfer of heat between the inside of the house and the outside of the house. The direction of transfer depends upon whether the heat reservoir (outside atmosphere) is warmer or cooler than the interior temperature. By anology this same situation exists in every circumstance where temperature control is applied. There is always some heat reservoir causing a transfer of heat, temperature control being applied to balance out the transfer. While the present invention applies broadly to most systems for this purpose, the description in the present application is directed primarily to a domestic central heating system as exemplary.

Modern domestic central heating systems commonly use hot water or hot air as a medium for extracting heat from the central heater and transporting it to the rooms to be heated. Also commonly, the central heater includes thermostatic controls that determine the temperature at which the heat exchange medium shall leave the central heater. This temperature is usually a fixed temperature that varies only by dropping when the central heater cannot replace heat as fast as it is lost. This temperature thus remains the same for an outdoor temperature of 60° as it is for an outdoor temperature of 0°. If it is set for a median point, then at 60° with the room thermostat calling for 70°, the temperature in the rooms overshoots rapidly to 75° or more and then waits a long time before the next cycle. These sudden surges of temperature change are uncomfortable and waste heat. At 0° outside and the thermostat calling for 70°, the opposite problem occurs. Instead of too fast recovery, the recovery is too slow and the room temperature continues to fall even after the thermostat calls for heat resulting in large and uncomfortable temperature swings. Experience tells us that we can be quite comfortable at lower temperatures as long as they are stable. Thus a stable temperature at 68° can be as comfortable as a varying temperature averaging 72°. Recognizing this, large commercial establishments have for many years utilized expensive control systems to vary the thermostatic control of the heat exchange medium with changes in outdoor temperature. These systems today commonly use thermal expansion devices as temperature sensing elements. Thermal expansion devices for the most part are bulky, expensive and require a housing. Thermistors can be used, but have nonlinear characteristics which require compensation. This raises the cost, reduces reliability and increases replacement problems.

It has been known for some time that the forward voltage drop of a pn semiconductor junction varies linearly with temperature. This fact has already had numerous applications for temperature compensating of electronic circuits. It has had little recognition for general temperature sensing purposes. This may be due to the small voltage swings obtainable plus the much larger and obscuring nominal forward voltage drop.

SUMMARY OF THE INVENTION

Now, in accordance with the present invention, a temperature compensation controller is provided which is simple, economical and readily connected into preexisting thermostatic controllers on most domestic temperature conditioning systems. This result is achieved by sensing outdoor temperature by change in forward pn junction voltage drop, sensing exchange medium temperature by change in forward pn junction voltage drop, detecting these changes with a differential amplifier and driving a contactor with the amplifier so as to open and close energy control to the temperature conditioning source. In a preferred embodiment, the voltage drops of all the pn junctions are summed and the temperature conditioning source is operated as part of a closed loop control system to maintain the sum of the voltage drops constant.

Thus it is an object of the invention to provide control apparatus for controlling a central temperature conditioning system so that the temperature of the heat exchange medium is maintained at a controlled inverse relation with outdoor temperature.

It is a further object of the invention to provide a method for controlling a temperature conditioning system so that the temperature of the heat exchange medium is maintained inversely related to a temperature reservoir causing undesired heat transfer.

Further objects and features of the invention will become apparent upon reading the following description together with the drawing.

BRIEF DESCRIPTION OF THE DRAWING

FIG. 1 is a diagram, partially schematic, of a heating system in accordance with the invention;

FIG. 2 is a schematic diagram of a temperature compensation controller in accordance with the invention;

FIG. 3 is a partial schematic diagram of an alternative output configuration for the controller of FIG. 2

FIG. 4 is a simplified partial schematic diagram of an alternative summing circuit for the controller of FIG. 2.

DESCRIPTION OF THE PREFERRED EMBODIMENTS

The significant parts of a temperature compensation controller according to the invention are a few inexpensive semiconductor diodes, a single common type of integrated circuit as a differential amplifier, a triac or small relay as a contactor and means to provide an accurate voltage reference.

FIG. 1 depicts by way of example,, an oil-fired forced hot water central heating system. Furnace 11 has oil burner 12 which operates responsive to thermostat 14 to heat water which is then circulated by pump 15 through radiators (not shown) in space to be heated. Thermostat 14 is a conventional room thermostat powered by 24 volts AC from transformer 16. Transformer 16 is usually located with, or as part of, a controller for both the burner and circulator (in a forced circulation system). Such a controller includes a number of relays and other devices for insuring proper and safe operation of the burner and circulator. Only a few of the essential elements are shown schematically in FIG. 1 to show the interconnection of the present inventive device. Thus in FIG. 1 controller 17 is depicted as including transformer 16, thermostat relay 18 and relay contacts 20, 21, 22 and 23. Contacts 20 are normally open contacts closed by thermostat relay 18 when thermostat 14 calls for heat. Contacts 21 are normally-closed high-limit contacts. In a hot water system the high limit contacts are normally operated by an aquastat to open when the water temperature in the furnace has reached the highest safe limit. Contacts 23 which also operate off thermostat relay 18 are connected to operate circulating pump 15. In accordance with the invention, further set of normally closed contacts 22 is connected in series with contacts 20 and 21 in the line to burner 12. In other systems using gas, electric or other prime energy sources, the electric line containing contacts 20, 21 and 22 would provide power to operate, by way of example, gas valves, power relays or other devices for controlling the main heating source. In FIG. 1, the inventive device operates relay contacts 22 by means of relay 25. Relay 25 in turn is driven by a temperature compensation controller 26, an embodiment of which is depicted in detail in FIG. 2.

Still referring to FIG. 1, it will e seen that temperature compensation controller 26 is energized by 24 volts AC taken from the secondary of transformer 16 by connecting leads 27 and 28. Lead 30 from temperature compensation controller 26 connects to an outdoor module 31 containing two semiconductor diodes. Module 31 in turn is connected by lead 32 to module 34 mounted in thermal contact with the outlet water circulation pipe 35 of furnace 11. Module 34 is depicted as containing two further semiconductor diodes. Module 34 is connected by lead 36 back to temperature compensation controller 26.

An example of the temperature compensation controller 26 is depicted schematically in FIG. 2. AC voltage source 40 is typically 24 volts from a thermostat transformer. Half-wave rectifier 41, current-limiting resistor 42 and capacitor 44 form a half-wave rectifying system for converting AC to DC. The active component is differential amplifier 45 having its positive supply terminal connected to positive supply lead 46. Lead 46 is connected from the junction of capacitor 44 and source 40. Negative supply lead 47 is connected to the junction of capacitor 44 and resistor 42. Supply lead 47 is also connected to the negative supply terminal of amplifier 45. Relay 25 has its coil connected between output terminal 48 of amplifier 45 and negative supply lead 47.

Relay 25 has two sets of contacts, one normally closed set 22 and one normally open set 55. Contacts 22 are suitable for use in a system for heating as depicted in FIG. 1 while contacts 55 are suitable for use in a system for cooling.

Where applicable the same numbers are used in FIG. 2 as used in FIG. 1. While the supply voltage stability for amplifier 45 is noncritical, a stable reference source is necessary for the input circuitry to amplifier 45. Differential amplifier integrated circuits are available that include such a stable reference source in their internal circuitry. Where such an internal source is not available, temperature compensated zener diode 50 can be connected with its anode to negative supply lead 47 and its cathode connected through resistor 51 to positive supply lead 46. The junction of resistor 51 and zener diode 50 then becomes stable fixed voltage 53. Fixed voltage 53 is connected through current limiting resistor 52 to two semiconductor diodes in series inside module 31. The two diodes inside module 31 are further connected in series with two diodes inside module 34, which in turn is connected to negative supply lead 47. All four diodes are connected in series and all with the same polarity, the anode of the first being connected to resistor 52 and the cathode of the last being connected to negative supply lead 47. Resistor 54 is connected with its first end to the junction of resistor 52 and diode module 31 and its second end to inverting input 70 of amplifier 45. A voltage divider consisting of resistors 60, 61, 62 and 63 is connected from the junction of zener diode 50 and resistor 51 to negative supply lead 47. Switch 56 from lead 47 across resistor 63 is operable to raise the voltage at noninverting input 71 of amplifier 45. This allows modification of the relationship to outdoor temperature when the indoor thermostat is lowered at night or while people are away.

Resistor 61 is a potentiometer having its moveable contact 64 connected to noninverting input 71 of amplifier 45. Capacitor 65, connected between resistor 54 and negative supply lead 47 is a filter to shunt out noise picked up by the leads to diode modules 31 and 34.

In FIG. 2 amplifier 45 is described as having its output 48 connected to a relay 25. Contacts 22 of relay 25 are those described in FIG. 1 for use in the burner circuit of a heating system. Additional normally-open contacts 55 are also provided in relay 25 for temperature compensation of a cooling unit. When he temperature reservoir producing the undesired heat transfer is warmer than the desired temperature the inventive controller must operate in the opposite or reverse manner from the way it operates when the temperature reservoir is colder than the desired temperature. In the configuration of FIG. 2 normally-closed contact 22 and normally-open contact 55 are available for the inverted operations.

The operation of the circuit of FIG. 2 is determined by the position of moveable contact 64 which provides an adjustable reference voltage to input 71 of amplifier 45. Moveable contact 64 is positioned to exactly cancel the effect of the combined voltage drops of the diodes in modules 31 and 34 when the diodes outdoors in module 31 are at a known temperature and the diodes indoors in module 34 are at a temperature that is a predetermined desired amount different from the known outdoor temperature.

After this setting has been made, if the diodes in module 34 become warmer the voltage drop across them will become smaller reducing the summed voltage drop at the inverting input 70 of amplifier 45. When the inverting input 70 of amplifier 45 goes below noninverting input 71, the output of amplifier 45 goes positive providing current through output lead 48 to relay 25. Referring back to FIG. 1 it will be seen that this results in contacts 22 opening stopping oil burner 12. With oil burner 12 stopped, the temperature at water outlet 35 will gradually go down cooling diode module 34 until equilibrium at inputs 70 and 71 is again reached turning amplifier 45 off. A similar operation occurs if outdoor module 31 becomes warmer. However, if the outdoor module 31 becomes colder then the voltage drop across the diode string becomes higher placing a more positive voltage on inverting input 70. This in turn requires that diode module 34 become warmer in order to offset the voltage drop in diode module 31 and allow amplifier 45 to again switch positive. Thus the temperature compensation control of FIG. 2 provides a closed loop control system requiring that the heat exchange medium vary inversely with outdoor temperature. Referring to FIG. 1, the feedback element in the closed loop system is diode module 34 which is driven by the operation of furnace 11 to maintain the balance at amplifier 45.

The diodes in module 31 and 34 may be of the same type and equal in number. Changes in type and/or number can be utilized for weighting the relationship between the two modules. Transistors and other semiconductor devices can be used for forward biased pn junctions. The number of junctions used in each module is selected for convenience, the biasing consideration of the differential amplifier and weighting. Differential amplifier 45 can be taken from a long list of integrated circuits under the names of operational amplifiers, voltage comparators, differential comparators, voltage regulators, etc. On-off operation of amplifier 45 is preferred. Thus an inherent switching characteristic for amplifier 45 is desirable. Operational amplifiers and similar should be provided with positive feedback giving hysteresis.

While the output connection is described in FIG. 2 as a DC relay, other types of output connections are contemplated and an example of one is shown in FIG. 3. FIG. 3 shows only the output connections. Connection 48 from amplifier 45 as well as the two leads 43 and 46 from source 40 show the relation to FIG. 2. Between lead 46 and lead 43 triac 72 and load impedance 74 are connected in series. Output lead 48 of amplifier 45 is connected to the gate of triac 72. When amplifier 45 switches off (negative output) triac 72 is driven into conduction and passes the AC current on leads 46 and 43 through load 74. In this case 74 can be a 24 volt AC relay or an AC solenoid driving, for example, a gas valve or it may be any other load where this type of arrangement is more convenient than the DC relay of FIG. 2.

It can be desirable to change the weighting of the relationship between diode module 31 and 34. It is possible to do this by changing the types of diodes in one of the modules or changing the number of junctions in one module with respect to the other. It is also possible to accomplish this result by a variable control inside the controller assembly. FIG. 4 depicts an input circuit for amplifier 45 to produce this result. In the arrangement of FIG. 4, module 31 is connected in series with resistor 80 between reference 53 and negative lead 47. Module 34 is connected in series with resistor 81 between reference 53 and negative lead 47. A potentiometer 82 is connected with one end to the junction of resistor 80 and module 31 and the other end to the junction of resistor 81 and module 34. Moveable contact 84 of potentiometer 82 is connected through resistor 54 to inverting input 70 of amplifier 45. The remaining elements depicted in the circuit of FIG. 4 are the same as those depicted in FIG. 2. if modules 31 and 34 and resistors 80 and 81 are matched pairs then the voltage that would be detected at the center of potentiometer 82 by moveable contact 84 would be directly proportioned to the sum of the voltage drops across modules 31 and 34. By moving contact 84 one way or the other the voltage drops across one of modules 31 and 34 can be given greater effect thus producing a weighted output. With the same reference voltage 53, this arrangement will produce a lower input voltage at noninverting input 70 which can be compensated for by adjusting the position of contact 64 of potentiometer 61 or by providing junctions within modules 31 and 34 producing a higher voltage drop. Other ways for adjusting the circuit balance will be obvious within the skill of the art.

While the invention has been described in relation to specific embodiments, it is not intended to be limited thereby but generally to cover arrangements in which two groups of pn junctions have their voltage drops summed and used to drive a differential amplifier in order to provide temperature compensation in a temperature conditioning system. Accordingly it is intended to cover the invention as set forth within the scope of the following claims.

I claim:
1. A method of temperature control for varying the temperature of a heat transfer medium in a temperature conditioning system inversely with the temperature of the thermal reservoir producing the undesired heat exchange comprising:
   a. sensing the voltage drop of at least one forward biased semiconductor pn junction thermally coupled to the thermal reservoir;
   b. sensing the voltage drop of at least one forward biased semiconductor pn junction thermally coupled to the heat transfer medium at least one point in its circulation path from and to the temperature conditioning source of said system;
   b. combining the sensed voltage drops of all said pn junctions to derive a control voltage varying directly with the sum of said voltage drops;
   d. comparing a reference voltage with said control voltage; and
   e. changing the operation of said temperature conditioning source as the difference between said reference voltage and said control voltage changes polarity.

2. A method of temperature control according to claim 1 wherein the voltage drops across said pn junctions are algebraically summed to obtain said control voltage, said temperature conditioning system is a heating system, said source is a heat source and said changing the operation consisting of enabling said heat source when said control voltage exceeds said reference voltage and inhibiting said heat source when said control voltage is less than said reference voltage.

3. A method of temperature control according to claim 2 wherein said heat source includes a burner, said enabling comprises turning on said burner and said inhibiting comprises turning off said burner.

4. A method of temperature control according to claim 1 wherein said control voltage is derived by dividing the diference of the pn junction voltage drop of the thermal reservoir and the pn junction voltage drop at the heat transfer medium with a voltage divider and selecting a point on such voltage divider for connection as a control voltage terminal.

5. Electrical apparatus for varying the temperature of a heat transfer medium in a temperature conditioning system inversely with the temperature of the thermal reservoir producing the undesired heat exchange comprising:
   a. first at least one semiconductor pn junction for location thermally coupled to said thermal reservoir;

b. second at least one semiconductor pn junction for location thermally coupled to a heat transfer medium issuing from a temperature conditioning source;

c. first electrical circuit means for interconnecting all of said pn junctions and providing forward electrical bias to each said pn junction;

d. a differential amplifier having a first input terminal, a second input terminal and an output terminal;

e. second electrical circuit means connected to said first input terminal to provide a reference voltage;

f. electrical connection means connecting said pn junctions to said second input terminal for applying a voltage to said input terminal that varies directly with the sim of the voltage drops across all said pn junctions; and, g. electrical contactor means connected to said output terminal for driving a control of a temperature conditioning source as the voltage between said first input terminal and said second input terminal changes polarity.

6. Electrical apparatus according to claim 5 wherein all of said semiconductor pn junctions are connected in series and said electrical connection is a connection from one end of said series to said second input terminal.

7. Electrical apparatus according to claim 5 wherein said first at least one semiconductor is connected in series with an impedance with a first junction point therebetween, said second at least one semiconductor is connected in series with a further impedance with a second junction point therebetween, and a third impedance is connected between said first junction point and said second junction point, said third impedance having a tap connected to said second input terminal.

8. Electrical apparatus according to claim 7 wherein said tap is moveable along said third impedance to provide weighting between the voltage at said first junction compared to the voltage at said second junction.

9. Electrical apparatus according to claim 5 wherein said electrical contactor is a relay with a set of normally-closed contacts.

10. Electrical apparatus according to claim 5 wherein said electrical contactor is a thyristor connected in series with a control device.

11. Electrical apparatus according to claim 5 wherein said apparatus is connected into the central heating system controller for a building and wherein said first at least one semiconductor comprises two diodes connected in series and mounted outside of the building, said second at least one semiconductor comprises two diodes connected in series and mounted in thermal contact against a conductor for the heat transfer medium of the system, said electrical contactor opens and closes a circuit to the heat source of said system; and, said apparatus is connected to receive electrical power from a thermostat transformer located at said controller.

* * * * *